United States Patent [19]

Hansen

[11] Patent Number: 4,602,479

[45] Date of Patent: Jul. 29, 1986

[54] FUEL CONTROL

[75] Inventor: Kenneth P. Hansen, Enfield, Conn.

[73] Assignee: United Technologies Corporation, Hartford, Conn.

[21] Appl. No.: 744,087

[22] Filed: Jun. 12, 1985

[51] Int. Cl.⁴ ............................................. F02C 9/28
[52] U.S. Cl. ................................................. 60/39.281
[58] Field of Search ......................... 60/39.15, 39.281

[56] References Cited

U.S. PATENT DOCUMENTS

| 3,946,551 | 3/1976 | Linebrink et al. | 60/39.281 |
| 4,010,606 | 3/1977 | Hansen | 60/39.281 |
| 4,229,937 | 10/1980 | Smith | 60/39.281 |
| 4,394,811 | 7/1983 | Swick | 60/39.281 |
| 4,411,133 | 10/1983 | Stearns et al. | 60/39.281 |
| 4,449,359 | 5/1984 | Cole et al. | 60/39.094 |
| 4,493,187 | 1/1985 | Hansen | 60/39.281 |

Primary Examiner—Louis J. Casaregola
Attorney, Agent, or Firm—John Swiatocha

[57] ABSTRACT

A reduced fuel flow to a gas turbine engine experiencing impending overspeed operating conditions is provided through a line (250) which bypasses the main shutoff valve (70) of the engine's fuel control (20). A transfer valve (260) disposed in the bypass line actuates the shutoff valve in response to such overspeed conditions while opening the normally closed bypass line. A flow resticter (275) and the fuel control's main pressure regulating valve (210) combine to maintain the reduced fuel flow at a predetermined valve.

9 Claims, 1 Drawing Figure

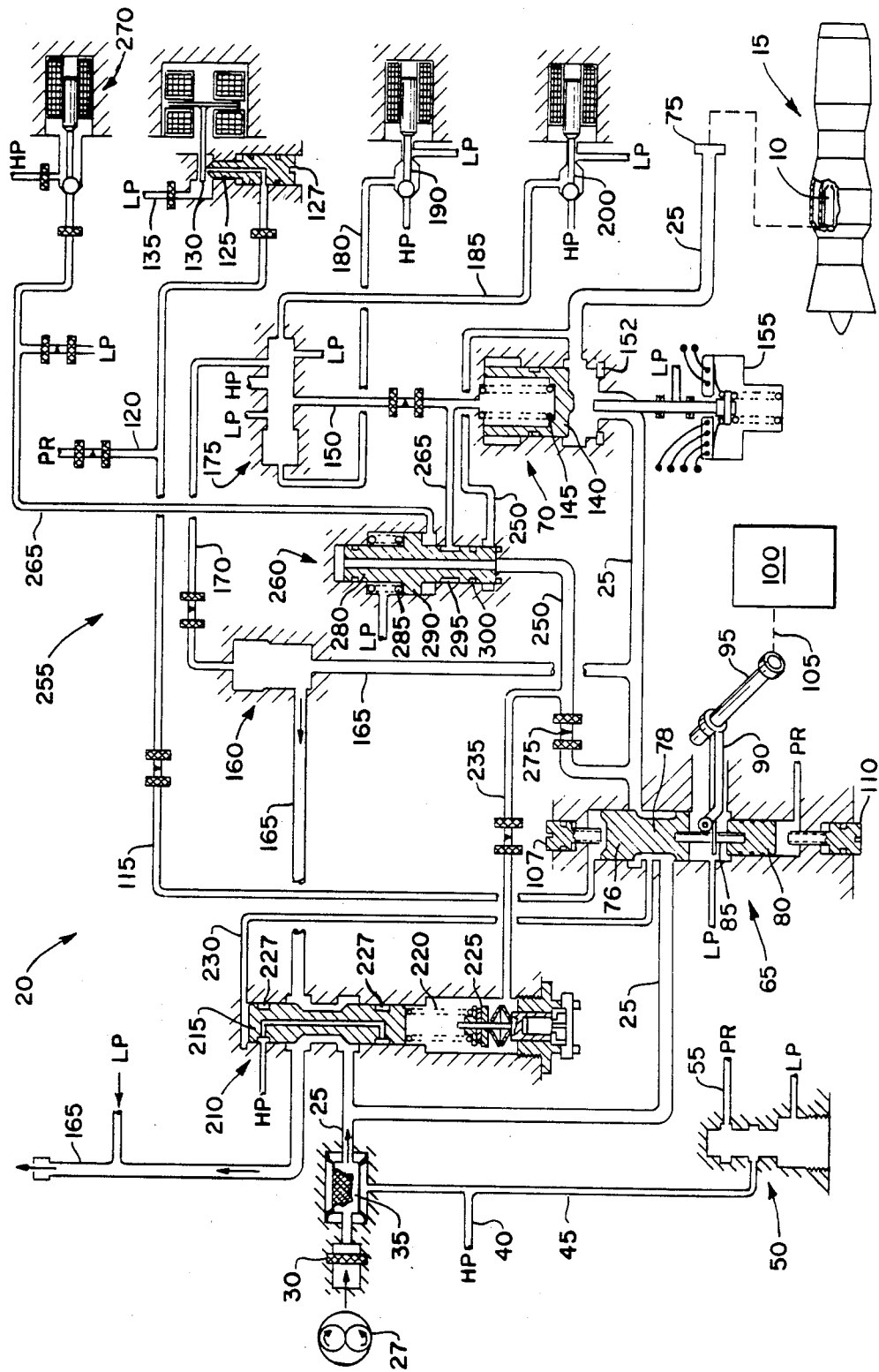

FUEL CONTROL

DESCRIPTION

1. Technical Field

This invention relates generally to fuel controls for gas turbine engines and particularly to an improved hydromechanical portion of a gas turbine engine fuel control which provides enhanced engine overspeed protection.

2. Background Art

To reduce the risk of failure from such conditions as mechanical overloading and excessive operating temperatures, most gas turbine engines have limited upper operating speeds. Often, overspeed conditions, particularly in such engines employed in powering aircraft, result from the failure of a metering valve in the engine's fuel control, which meters fuel to the engine or an erroneous signal from an associated electronic engine controller which adjusts the metering valve to an excessive high flow setting. In the past, impending engine overspeed conditions were handled by essentially total engine shutdown. However, as those skilled in the art will appreciate, the aerodynamic drag associated with a completely shut down gas turbine aircraft engine is significant. Such drag forces not only adversely effect the overall operating efficiency of a multi-engine aircraft in which the inoperable engine is employed, but also, in large measure, adversely effect the handling characteristics of the aircraft.

DISCLOSURE OF INVENTION

Therefore, it is among the objects of the present invention to provide a fuel control for a gas turbine engine which reduces engine drag effects due to a shutdown thereof in response to impending engine overspeed conditions.

This and other objects of the present invention, which will become more apparent from the following detailed description taken in connection with the appended claims and accompanying drawing, are achieved by a fuel control which reduces engine fuel flow to a magnitude corresponding to minimal thrust output of the engine at sea level in response to impending engine overspeed conditions. This substantially reduces the areodynamic drag associated with an otherwise inoperable engine to which fuel flow has been completely cut off and therefore, enhances the efficiency and handling characteristics of a multi-engine aircraft experiencing such conditions in one or more of the engines thereof. Fuel flow to the engine is so reduced by a bypass circuit in the engine's fuel control which effectively bypasses a fuel shutoff valve to limit such fuel flow to the engine upon actuation of the shutoff valve in response to the impending overspeed conditions. The bypass circuit includes a flow restrictor to maintain such limited fuel flow despite high flow settings of the fuel metering valve due to a failure thereof, or an erroneous setting thereof by an associated electronic engine controller. The engine shutoff valve may be hydraulically actuated by a transfer valve communicating with the bypass circuit to open and close the bypass circuit in response to a signal indicative of impending engine overspeed conditions. The bypass circuit may be used with any known pressure regulating valve connected between an inlet of the metering valve and a location downstream of the flow restrictor, whereby under normal operating conditions, when the bypass circuit is closed by the transfer valve so that there is no flow past the restrictor, the pressure regulating valve in effect senses the pressure directly across the metering valve for the normal control of fuel to the engine.

BRIEF DESCRIPTION OF DRAWING

The sole FIGURE is a partial schematic illustration of a portion of a gas turbine engine fuel control including the invention herein.

BEST MODE OF CARRYING OUT THE INVENTION AND INDUSTRIAL APPLICABILITY

Referring to the drawing, fuel flow to the burner 10 of a gas turbine engine 15 is controlled by a fuel control having a hydromechanical portion 20 and an electronic engine control (EEC) portion (not shown). For clarity, only that portion of hydromechanical portion 20 relevant to the present invention is shown in detail herein. Hydromechanical fuel controls per se are generally well known in the art, representative fuel controls being the JFC-60 and JFC-68 fuel controls manufactured by the Hamilton Standard Division of United Technologies Corporation.

In a manner well known in the art, pressurized fuel is provided to main fuel line 25 by a suitable pump 27 through inlet strainer 30 and filter 35. The strainer and filter lower the fuel pressure somewhat to a value hereinafter referred to as supply or high pressure (illustrated as HP) at tap 40 of line 45. Line 45 provides fuel at supply pressure to a pressure regulating valve 50 which establishes and maintains a regulated servo pressure (PR) at outlet 55. This servo pressure is of a magnitude between low drain pressure (LP) and supply pressure, and is used as a constant control pressure in various parts of the fuel control. High pressure fuel in line 25 passes through metering valve 65 (which sets the magnitude of the flow) and shutoff valve 70 before being discharged to burner 10 through outlet 75.

Metering valve 65 includes a moveable valve element 76, having a medial portion 78 of reduced diameter and connected to piston 80 by rod 85. Rod 85 connects to arm 90 which drives shaft 95, mechanically connected to resolver 100 by any suitable linkage indicated by dashed line 105. Resolver 100 provides an electrical feedback signal indicative of the position of the metering valve to the EEC. Adjustable stops 107 and 110 limit the travel of valve element 76 and piston 80 respectively. The interior of the valve between the valve element and piston is maintained at drain pressure and the lower end of piston 80 is maintained at regulated pressure (RP).

Those skilled in the art will appreciate that when the net downward pressure forces on valve element 76 and piston 80 are equal to the net upward forces on those elements, the valve is balanced and flow therethrough remains constant. To adjust the flow through metering valve 65, fluid pressure on the upward surface of valve element 76 is adjusted by adjusting the pressure in line 115 supplied with fuel at regulated pressure PR through inlet 120. This adjustment is made by adjusting the effective area of nozzle 125 (nutt adjustment thereof being effected by screw adjuster 127) by positioning solenoid actuated flapper 130 to selectively vary the flow of fuel to drain through outlet 135. Input signals to the flapper solenoid are provided from the EEC.

Flow through main fuel line 25 is turned on and off by shutoff valve 70 including a chamber having a reciprocally movable, fluid operated valve element 140 therein. Valve element 140 is biased downwardly by spring 145 and communicates at the upper surface thereof with line 150. When high pressure fuel is applied to valve element 140 through line 150, the valve element seats itself on seat 152 thereby blocking fuel flow through main fuel line 25. When high pressure in line 150 is replaced by drain pressure, flow through main line 25 lifts valve element 140 off seat 152 thereby opening main fuel line 25 to fuel flow therethrough. Closure of the shutoff valve actuates switch 155 which provides a signal to the EEC indicative of such closure.

Windmill bypass valve 160 of a structure similar to that of shutoff valve 70 is disposed in return line 165 which branches from main fuel line 25 between metering valve 65 and shutoff valve 70. Like the shutoff valve, windmill bypass valve 160 includes a fluid operated, reciprocally movable valve element (not shown) biased downwardly by a spring (also not shown). The bypass valve element is seated, closing return line 165 to flow therethrough by fluid pressure applied to the valve element from line 170. Application of drain pressure to the valve element enables flow through line 165 to lift the valve element off its seat so as not to impede such flow.

Fluid pressure in lines 150 and 170 is controlled by sequence valve 175, having a spool-type valve element (not shown) therein operated by fluid pressure applied to the ends thereof through lines 180 and 185. The connection of high pressure fuel to line 180 is controlled by solenoid operated shutoff pilot valve 190 while the connection of line 185 to high pressure fuel is controlled by solenoid operated, start and run pilot valve 200. Both valve solenoids are energized by signals from the EEC. Those skilled in the art will appreciate that shutoff valve 70, windmill bypass valve 160, and sequence valve 175, along with the associated control lines and solenoid valves comprise a circuit for controlling engine startup and shutdown under normal operating conditions. Details of this portion of the fuel control are found in U.S. Pat. No. 4,493,187 to Kenneth P. Hansen. When it is desired to start engine 15, sequence valve 175 is set by the appropriate actuation of the pilot valves to port drain pressure to shutoff valve 70 thereby allowing pump discharge through main fuel line 25 to lift valve element 140 off seat 152, thereby allowing continuous flow through line 25. At the same time, sequence valve 175 applies high pressure to the valve element of windmill bypass valve 160 to close return line 165 so that all of the pump output is available to burner 10. When it is desired to shut engine 15 down, pilot valves 190 and 200 are actuated to reverse the application of control pressure to shutoff valve 70 and windmill bypass valve 160, thereby closing valve 70 and allowing any pressurized fuel to be returned to the pump via line 165 and the windmill bypass valve.

A pressure regulating valve 210 maintains a predetermined pressure drop across metering valve 65 so that fuel flow to the engine may be precisely scheduled as a function of metering valve flow area. Pressure regulating valve 210 includes a reciprocally moveable valve element 215 biased upwardly by spring 220 held on a mount 225 provided with suitable adjusting and temperature compensating mechanisms. As illustrated, high pressure fluid may be delivered to grooves 227 in the surfaces of valve element 215 for purposes of minimizing leakage therearound of fuel input to this valve. The pressure drop being controlled is applied to opposite ends of valve element 215 by lines 230 and 235. Excess flow (that which is unnecessary for maintenance of the required pressure drop) is returned to the pump from main fuel line 25 through pressure regulating valve 210 and return line 165.

That portion of fuel control 20 described hereinabove forms no part of the present invention, but is included herein as an example of the environment in which the overspeed control of the present invention has been determined to be most useful.

As set forth hereinabove, to reduce the drag associated with an engine otherwise shutdown because of impending overspeed conditons, it is desirable to maintain a minimal fuel flow to the engine so that at sea level, the engine develops some thrust. In the present invention this is accomplished by the provision of bypass line 250 which shunts fuel flow around shutoff valve 70, and a control means 255 which includes a transfer valve 260 disposed in bypass line 250 and control line 265 which connects transfer valve 260 with solenoid operated pilot valve 270.

Referring once again to the drawing, bypass line 250 communicates at opposite ends thereof with the main fuel line so as to shunt fuel flow around the shutoff valve. A flow restrictor (orifice) 275 disposed in bypass line 250 immediately upstream of the connection thereof to control line 235, restricts flow through line 250 to a value sufficient to maintain only minimal positive thrust output of the engine at sea level. Transfer valve 260 controls the opening and closing of bypass line 250 and includes a reciprocally moveable, fluid operated valve element 280 biased downwardly by spring 285. As illustrated, valve element 280 includes a generally centrally disposed land 290 and grooves 295 and 300, groove 295 being shown in registry (fluid communication) with control line 265.

As illustrated, solenoid operated pilot valve 270 controls the application of high pressure fuel to the inlet of control line 265 and hence, the undersurface of transfer valve land 290.

The operation of the overspeed control system of the present invention is as follows. Assuming normal operating conditions, transfer valve element 280 is seated (as illustrated) and all flow through bypass line 250 is blocked. Since there is no flow through line 250, pressure regulating valve 210 senses and maintains the pressure drop across metering valve element 76 even though the control line 235 for the pressure regulating valve is connected to bypass line 250 downstream of orifice 275. Assuming that impending overspeed conditions are sensed, a signal is sent by the EEC to solenoid operated valve 270 which opens, connecting line 265 with high pressure fuel. This high pressure fuel is applied to the undersurface of transfer valve element land 290, lifting the valve element against the downward biasing force of spring 285. Such unseating of the transfer valve element establishes a continuous passage for the high pressure fuel through circumferential groove 295 in the transfer valve element and finally to line 150. Application of high pressure fuel to line 150 results in the application of high pressure to the interior of shutoff valve element 140, seating this valve element to block main fuel line 25. However, such actuation of the transfer valve opens bypass line 250 through the transfer valve beneath the valve element thereof. Since main fuel line 25 is blocked and bypass line 250 is opened, fuel will flow through the metering valve past orifice 275, through bypass line 250, and around closed shutoff valve 70 to outlet 75. Since main fuel line 25 is blocked and bypass line 250 is opened, pressure regulating valve 210 now senses the pressure drop across the serial connection of metering valve 65 and orifice 275 to maintain a constant pressure drop thereacross. This constant pressure drop along with the constant flow area of orifice 275 sets a constant minimal bypass fuel flow to the engine to maintain a predetermined minimal thrust output of the engine at sea level, to reduce the drag associated with an otherwise completely shut down engine and the adverse aerodynamic characteristics assoicated therewith.

As set forth hereinabove, switch 155 provides an indication of the actuation of shutoff valve 70 for an indication to a pilot of such overspeed conditions or for purposes of testing the overspeed control system.

While a particular embodiment of the invention herein has been shown, it will be appreciated that various modifications thereto will suggest themselves to those skilled in the art from the disclosure herein. Thus, while it is contemplated that high pressure and regulated pressure fuel will be used to control the operation of the various control valves herein, it will be understood that separate control fluids may be used. Similarly while specific structures of the control valves herein have been shown, it will be understood that various other equivalent valve mechanisms which achieve the results herein of automatically bypassing a shutoff valve with minimal fuel flow to maintain minimum engine thrust in response to impending overspeed conditions may be employed. Thus, it is intended that the claims hereof shall be construed to cover this and all other embodiments which fall within the true spirit and scope of this invention.

Having thus described the invention, what is claimed is:

1. In a fuel control for a gas turbine engine including a burner, fuel being supplied to said burner through a main fuel line having a shutoff valve therein, said shutoff valve under normal engine operating conditions, being opened to allow fuel flow to said burner and closed to shut off said fuel flow, the improvement characterized by:
 a bypass line communicating at opposite ends thereof with said main fuel line for shunting fuel flow in said main fuel line around said shutoff valve;
 means disposed in said bypass line for restricting flow therethrough to a value sufficient to maintain at sea level, only minimal positive thrust output of said engine; and
 control means communicating with said bypass line and operatively connected to said shutoff valve, said control means, under normal operating conditions, effecting the blocking of said bypass line and, under impending overspeed conditions, effecting a simultaneous closing of said shutoff valve and an unblocking of said bypass line to shunt said restricted flow around said shutoff valve to said engine.

2. The fuel control of claim 1 characterized by:
 said control means comprising a transfer valve in fluid communication with said bypass line and having a moveable valve element which blocks said bypass line under said normal engine operating conditions.

3. The fuel control of claim 1 characterized by said shutoff valve including a fluid operated normally open valve element and said control means including
 a source of pressurized control fluid;
 a control line providing communication between said shutoff valve and said source of control fluid;
 said control means comprising a transfer valve in communcation with said control line and having a moveable valve element, said valve element blocking said control line to cut off flow of said control fluid to said shutoff valve to allow said shutoff valve to remain open under normal engine operating conditions, and unblocking said control line to connect said shutoff valve with said control fluid source to close said shutoff valve under said impending engine overspeed conditions.

4. The fuel control of claim 3 characterized by said moveable transfer valve element being responsive to said control fluid in blocking and unblocking said control line, and by said control means further including:
 means disposed in said control line for connecting said transfer valve element to, and disconnecting said transfer valve element from, said source of pressurized control fluid to control the response of said transfer valve element to said control fluid.

5. The fuel control of claim 4 characterized by said connecting means comprising a pilot valve disposed in said control line upstream of said transfer valve and responsive to normal engine operating conditions and impending engine overspeed conditions.

6. The fuel control of claim 2 characterized by said flow restricting means comprising a flow control orifice of fixed area.

7. The fuel control of claim 1 characterized by means disposed in said main fuel line and operatively engageable by said shutoff valve for providing a signal indicative of flow through said main fuel line.

8. The fuel control of claim 1 characterized by said signal providing means comprising an electric switch.

9. The fuel control of claim 1 characterized by:
 a metering valve disposed in said main fuel line, upstream from said shutoff valve, adjustment in the flow area of said metering valve effecting an adjustment in the flow rate of fuel therethrough; and
 a pressure regulating valve in fluid communication with said bypass line, downstream of said flow restricting means and said main fuel line, proximally to the inlet of said metering valve, for maintaining a constant pressure drop across a serial connection of said metering valve and said flow restricting means.

* * * * *